(12) United States Patent
Nagata

(10) Patent No.: US 10,436,194 B2
(45) Date of Patent: Oct. 8, 2019

(54) MOTOR DRIVEN COMPRESSOR

(71) Applicant: KABUSHIKI KAISHA TOYOTA JIDOSHOKKI, Kariya-shi, Aichi-ken (JP)

(72) Inventor: Yoshiki Nagata, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 1026 days.

(21) Appl. No.: 14/542,830

(22) Filed: Nov. 17, 2014

(65) Prior Publication Data
US 2015/0139818 A1    May 21, 2015

(30) Foreign Application Priority Data
Nov. 18, 2013    (JP) .................. 2013-238097

(51) Int. Cl.
*F04C 14/06*    (2006.01)
*F04C 28/06*    (2006.01)
(Continued)

(52) U.S. Cl.
CPC .............. *F04C 14/06* (2013.01); *F04C 2/025* (2013.01); *F04C 18/0215* (2013.01);
(Continued)

(58) Field of Classification Search
CPC .......... F04C 14/06; F04C 2/025; F04C 28/06; F04C 18/0215; F04C 2270/07; H02P 27/08
See application file for complete search history.

(56) References Cited

U.S. PATENT DOCUMENTS 5,782,610 A * 7/1998 Ikeda .................. F04C 18/0215
                                                        318/379
5,820,349 A * 10/1998 Caillat .................... F04C 28/28
                                                        417/44.11
(Continued)

FOREIGN PATENT DOCUMENTS

JP    2003-120555 A    4/2003

OTHER PUBLICATIONS

Communication dated Mar. 20, 2015 from the European Patent Office in counterpart European Application No. 14192977.8.

*Primary Examiner* — Charles G Freay
*Assistant Examiner* — Lilya Pekarskaya
(74) *Attorney, Agent, or Firm* — Sughrue Mion, PLLC

(57) ABSTRACT

A motor-driven compressor includes a compression unit that includes movable and fixed scrolls and a compression chamber, an electric motor that includes a rotor and drives the compression unit, a motor drive circuit that drives the electric motor, an injection port that draws intermediate pressure refrigerant into the compression chamber, a controller that performs rotation control on the rotor, and a voltage detector that detects a terminal voltage of the electric motor. The compression unit compresses low pressure refrigerant drawn into the compression chamber to discharge high pressure refrigerant. The controller is configured to output a stop instruction to deactivate the rotation control of the rotor, determine a rotation condition of the rotor based on the voltage detected by the voltage detector after outputting the stop instruction, and perform, based on the determination, restart preparation control that includes outputting a lock instruction to electrically stop rotation of the rotor.

10 Claims, 3 Drawing Sheets

(51) Int. Cl.
*F04C 18/02* (2006.01)
*F04C 2/02* (2006.01)
*H02P 27/08* (2006.01)

(52) U.S. Cl.
CPC .......... *F04C 28/06* (2013.01); *F04C 2270/72* (2013.01); *H02P 27/08* (2013.01)

(56) References Cited

U.S. PATENT DOCUMENTS

| | | | | |
|---|---|---|---|---|
| 6,254,352 B1* | 7/2001 | Niizato | ................ | F25B 49/022 |
| | | | | 318/374 |
| 6,646,411 B2* | 11/2003 | Hirono | ...................... | H02P 3/18 |
| | | | | 318/757 |
| 9,048,771 B2* | 6/2015 | Ohba | ....................... | H02P 29/62 |
| 2006/0196202 A1* | 9/2006 | Harrod | ................. | F25B 49/022 |
| | | | | 62/228.1 |
| 2012/0194111 A1* | 8/2012 | Kawashima | ............ | H02P 27/08 |
| | | | | 318/400.27 |
| 2012/0249024 A1* | 10/2012 | Saha | ....................... | H02P 21/06 |
| | | | | 318/400.02 |
| 2012/0315173 A1* | 12/2012 | Nakamura | .......... | F04C 18/0215 |
| | | | | 418/55.2 |

* cited by examiner

MOTOR DRIVEN COMPRESSOR

CROSS-REFERENCE TO RELATED APPLICATIONS

This application is based upon and claims the benefit of priority from prior Japanese Patent Application No. 2013-238097, filed on Nov. 18, 2013, the entire contents of which are incorporated herein by reference.

BACKGROUND OF THE INVENTION

The present invention relates to a motor-driven compressor including an injection port that draws intermediate pressure refrigerant into a compression chamber formed by the engagement of a fixed scroll and a movable scroll.

Japanese Laid-Open Patent Publication No. 2003-120555 describes a motor-driven scroll compressor in which an injection pipe is connected to an injection port of a compression chamber. A vapor-liquid separator is connected to the injection pipe. The injection pipe includes a check valve. In a refrigeration cycle, the check valve opens the injection pipe during a high load operation (e.g., heating operation) and closes the injection pipe during a low load operation (e.g., cooling operation). During the high load operation of the refrigeration cycle, an intermediate pressure gaseous refrigerant separated by the vapor-liquid separator is injected into the compression chamber through the injection pipe, which is open through the check valve, and the injection port. This increases the amount of the gaseous refrigerant drawn into the compression chamber and improves the performance of the motor-driven compressor during the high load operation of the refrigerant cycle.

SUMMARY OF THE INVENTION

In the motor-driven compressor, when the operation of the motor-driven compressor is stopped by stopping the rotation control of the rotor of the electric motor, the forward rotation speed of the rotor gradually decreases. When the forward rotation of the rotor stops, the residual intermediate pressure gaseous refrigerant remaining in the injection pipe is drawn through the injection port into the compression chamber. As a result, the movable scroll starts to orbit in a reverse direction, which is opposite to that when the motor-driven compressor is operated. The orbiting motion of the movable scroll in the reverse direction rotates the rotor in the reverse direction. When the reverse rotation speed of the rotor exceeds a predetermined speed, it is difficult to restart the rotation control of the rotor. For example, to restart the operation of the motor-driven compressor, there is a need to wait until the reverse rotation speed of the rotor decreases to a speed that is low enough to restart the rotation control of the rotor. Therefore, when restarting operation of the motor-driven compressor, immediate restarting of the rotor rotation control may be hindered. In this manner, the conventional motor-driven compressor cannot be smoothly restarted.

It is an object of the present invention to provide a motor-driven compressor that may be smoothly restarted.

A motor-driven compressor according to one aspect of the present invention includes a compression unit that includes a movable scroll, a fixed scroll, and a compression chamber formed by engagement of the movable scroll and the fixed scroll, an electric motor that includes a rotor and drives the compression unit, a motor drive circuit that drives the electric motor, an injection port that draws intermediate pressure refrigerant into the compression chamber, a controller that performs rotation control on the rotor, and a voltage detector that detects a terminal voltage of the electric motor. The compression unit compresses low pressure refrigerant drawn into the compression chamber to discharge high pressure refrigerant. The controller is configured to output a stop instruction to deactivate the rotation control of the rotor, determine a rotation condition of the rotor based on the voltage detected by the voltage detector after outputting the stop instruction, and perform, based on the determination, restart preparation control that includes outputting a lock instruction to electrically stop rotation of the rotor.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

One embodiment of a motor-driven compressor will now be described with reference to FIGS. 1 to 5. The motor-driven compressor of the present embodiment may be installed in a vehicle for use with a vehicle air-conditioner.

Figure 1:
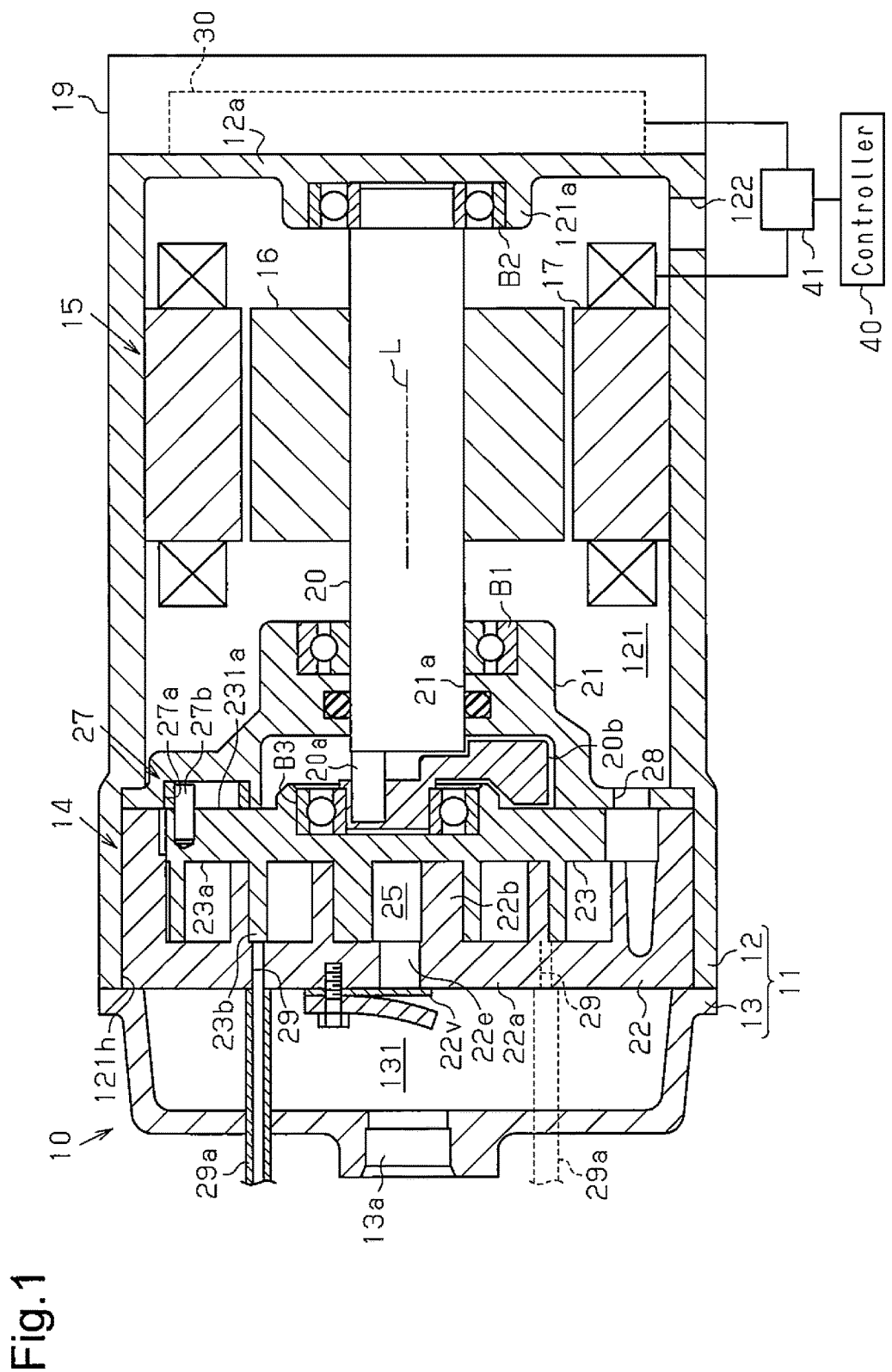
FIG. 1 is a cross-sectional view showing one embodiment of a motor-driven compressor.

As shown in FIG. 1, a motor-driven compressor 10 includes a housing 11 formed from a metal material (e.g., aluminum). The housing 11 may include a motor housing 12 and a discharge housing 13. The motor housing 12 includes an open end (left end in FIG. 1) forming an opening 121h. The discharge housing 13 is coupled to the open end. The motor housing 12 and the discharge housing 13 may each be cylindrical. The motor housing 12 accommodates a compression unit 14 that compresses a refrigerant and an electric motor 15 that drives the compression unit 14.

The motor housing 12 includes an end wall 12a at the opposite side of the opening 121h. A cylindrical shaft support portion 121a projects from a central portion of the end wall 12a toward the opening 121h. A shaft support member 21 is fixed to the motor housing 12 between the shaft support portion 121a and the opening 121h of the motor housing 12. An insertion hole 21a extends through a central portion of the shaft support member 21. The shaft support member 21 cooperates with the motor housing 12 to define a motor compartment 121, which accommodates the electric motor 15. The motor housing 12 accommodates a rotation shaft 20. Bearings B1 and B2 support the rotation shaft 20 to be rotatable in the shaft support member 21 and the shaft support portion 121a.

The electric motor 15 includes a rotor 16 (rotating part), which rotates integrally with the rotation shaft 20, and a stator 17 (stationary part) surrounding the rotor 16. The stator 17 may be fixed to an inner surface of the motor housing 12.

The compression unit 14 includes a fixed scroll 22 and a movable scroll 23. The fixed scroll 22 includes a fixed base plate 22a, which may be a disk, and a fixed spiral wall 22b, which is formed integrally with the fixed base plate 22a. The movable scroll 23 includes a movable base plate 23a, which may be a disk, and a movable spiral wall 23b, which is formed integrally with the movable base plate 23a.

An eccentric shaft 20a projects toward the opening 121h from one end surface of the rotation shaft 20 at a position separated from the rotation axis L of the rotation shaft 20. A bushing 20b is tightly fitted to the eccentric shaft 20a. The movable base plate 23a is coupled to the eccentric shaft 20a by a bearing B3 and the bushing 20b. This allows the movable base plate 23a to rotate relative to the bushing 20b and the eccentric shaft 20a.

The fixed spiral wall 22b and the movable spiral wall 23b are engaged with each other. A distal surface of the fixed spiral wall 22b contacts the movable base plate 23a. A distal surface of the movable spiral wall 23b contacts the fixed base plate 22a. A compression chamber 25 is defined by the fixed base plate 22a and the fixed spiral wall 22b and by the movable base plate 23a and the movable spiral wall 23b.

A rotation restriction mechanism 27 is arranged between the movable base plate 23a and the shaft support member 21. The rotation restriction mechanism 27 includes a plurality of annular holes 27a (only one is shown in FIG. 1) and a plurality of pins 27b. The annular holes 27a are located in an end surface of the shaft support member 21 opposing an end surface 231a of the movable base plate 23a. The pins 27b, which project from the end surface 231a of the movable base plate 23a, are loosely received in the annular holes 27a. The annular holes 27a and the pins 27b of the shaft support member 21 and the movable base plate 23a are located at positions separated from the rotation shaft 20 in the radial direction.

When the electric motor 15 rotates the rotation shaft 20, the eccentric shaft 20a causes the movable scroll 23 to orbit around the axis of the fixed scroll 22 (rotation axis L of the rotation shaft 20). In this case, the rotation restriction mechanism 27 restricts the rotation of the movable scroll 23. The orbiting motion of the movable scroll 23 reduces the volume of the compression chamber 25.

The motor housing 12 includes a suction opening 122. The shaft support member 21 includes a suction passage 28 communicating the motor compartment 121 and the compression chamber 25. The discharge housing 13 and the fixed base plate 22a define a discharge chamber 131. The discharge housing 13 includes a discharge opening 13a.

A discharge port 22e is located in a central portion of the fixed base plate 22a. The compression chamber 25 and the discharge chamber 131 are in communication through the discharge port 22e. A discharge valve 22v is attached to the fixed base plate 22a to cover the discharge port 22e.

A cover 19 is attached to the end wall 12a of the motor housing 12. A motor drive circuit 30 (indicated by broken lines in FIG. 1), which drives the electric motor 15, is accommodated in an area partitioned by the cover 19 and the end wall 12a of the motor housing 12. In the present embodiment, the compression unit 14, the electric motor 15, and the motor drive circuit 30 are sequentially arranged in an extending direction of the rotation axis L of the rotation shaft 20 (axial direction).

Figure 2:
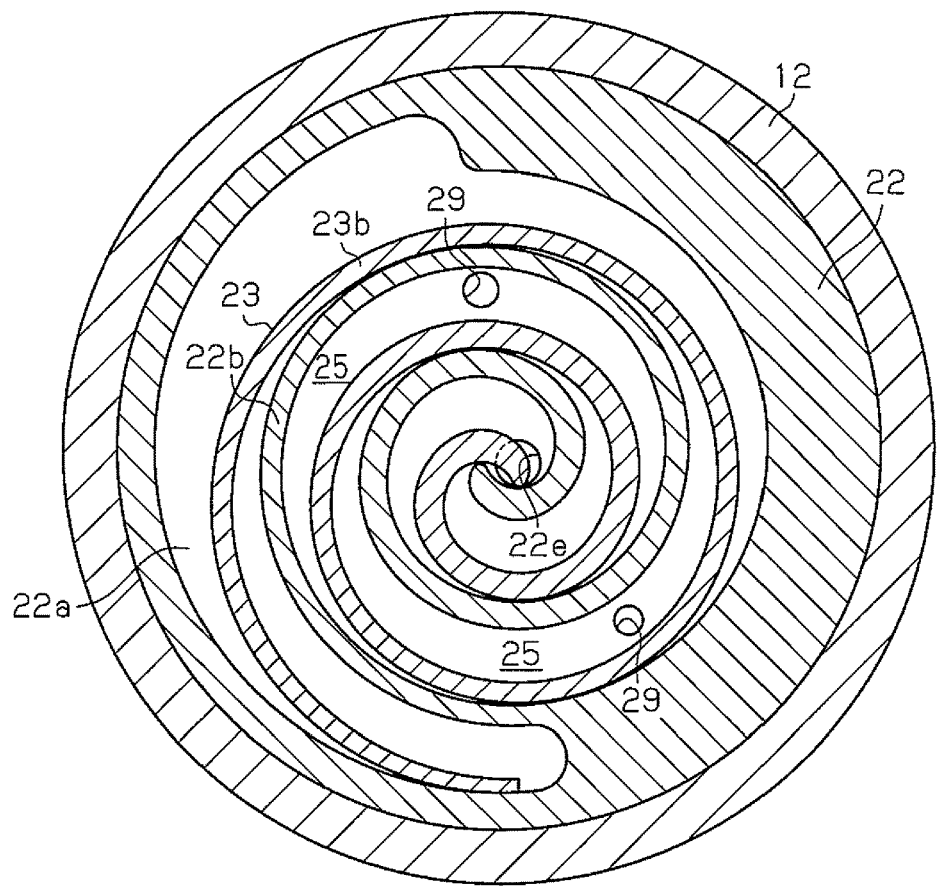
FIG. 2 is a cross-sectional view of the motor-driven compressor shown in FIG. 1.

As shown in FIG. 2, the fixed base plate 22a includes two injection ports 29. For example, each injection port 29 is a circular hole. In the fixed base plate 22a, the injection ports 29 are located at radially outer sides of the discharge port 22e. As shown in FIG. 1, an injection pipe 29a is connected to each of the injection ports 29.

Figure 3:
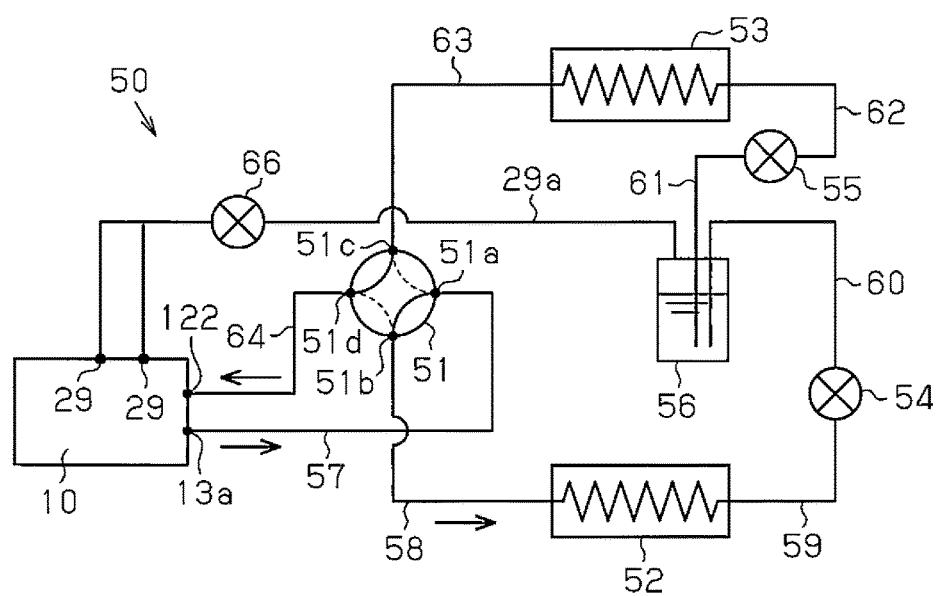
FIG. 3 is a schematic circuit diagram of a cooling-heating circuit.

As shown in FIG. 3, a cooling-heating circuit 50 includes the motor-driven compressor 10, a pipe switching valve 51, a first heat exchanger 52, a second heat exchanger 53, a first expansion valve 54, a second expansion valve 55, and a vapor-liquid separator 56.

The pipe switching valve 51 includes a first opening 51a, a second opening 51b, a third opening 51c, and a fourth opening 51d. The pipe switching valve 51 may switch between a first state (state that is indicated by solid lines in FIG. 3) and a second state (state that is indicated by broken lines in FIG. 3). In the first state, the first and second openings 51a and 51b are in communication with each other, and the third and fourth openings 51c and 51d are in communication with each other. In the second state, the first and third openings 51a and 51c are in communication, and the second and fourth openings 51b and 51d are in communication.

A discharge pipe 57 connects the discharge opening 13a and the first opening 51a of the pipe switching valve 51. A first pipe 58 connects the second opening 51b of the pipe switching valve 51 and the first heat exchanger 52. A second pipe 59 connects the first heat exchanger 52 and the first expansion valve 54.

A third pipe 60 connects the first expansion valve 54 and the vapor-liquid separator 56. A fourth pipe 61 connects the vapor-liquid separator 56 and the second expansion valve 55. A fifth pipe 62 connects the second expansion valve 55 and the second heat exchanger 53. A sixth pipe 63 connects the second heat exchanger 53 and the third opening 51c of the pipe switching valve 51. A suction pipe 64 connects the suction opening 122 and the fourth opening 51d of the pipe switching valve 51.

The vapor-liquid separator 56 is connected to the injection pipe 29a. The injection pipe 29a includes a plurality of branching lines connected to the injection ports 29. The injection pipe 29a includes a check valve 66.

Figure 4:
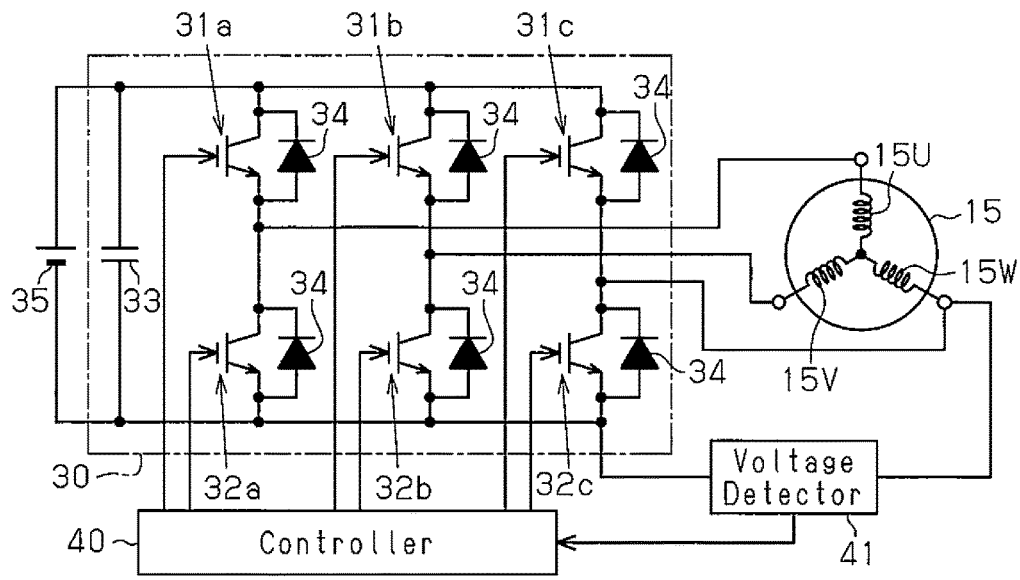
FIG. 4 is a circuit diagram of a motor drive circuit.

As shown in FIG. 4, the motor drive circuit 30 includes upper arm switching elements 31a, 31b, and 31c, lower arm switching elements 32a, 32b, and 32c, and a current smoothing capacitor 33. The upper arm switching elements 31a, 31b, and 31c and the lower arm switching elements 32a, 32b, and 32c are each connected to diodes 34. Each diode 34 causes a counter electromotive force generated by the electric motor 15 to flow back to a direct current power supply 35.

The bases of the upper arm switching elements 31a, 31b, and 31c and the lower arm switching elements 32a, 32b, and 32c are each connected to a controller 40. The controller 40 may include a computer processor configured to execute control method(s) or control program(s). The collectors of the upper arm switching elements 31a, 31b, and 31c are each connected to the direct current power supply 35. The emitters of the upper arm switching elements 31a, 31b, and 31c are respectively connected to a U-phase coil 15U, a V-phase coil 15V, and a W-phase coil 15W of the electric motor 15. The emitters of the lower arm switching elements 32a, 32b, and 32c are each connected to the direct current power supply 35. The collectors of the lower arm switching elements 32a, 32b, and 32c are respectively connected to the coils 15U, 15V, and 15W. The switching elements 31a, 31b, 31c, 32a, 32b, and 32c each perform a switching operation in accordance with a signal provided to the corresponding base.

The controller 40 is configured to control rotation of the rotor. For example, the controller 40 generates a PWM signal in accordance with a carrier signal, which may be a high frequency triangular wave signal, and a voltage instruction signal, which instructs the voltage. The controller 40 uses the PWM signal to control the switching operations of the upper arm switching elements 31*a*, 31*b*, and 31*c* and the lower arm switching elements 32*a*, 32*b*, and 32*c*. When the switching operations are performed in the upper arm switching elements 31*a*, 31*b*, and 31*c* and the lower arm switching elements 32*a*, 32*b*, and 32*c*, direct current voltage is converted to alternating current drive voltage in the motor drive circuit 30. By applying the alternating current drive voltage to the electric motor 15, the rotor 16 of the electric motor 15 rotates at the controlled rotation speed. The rotation control of the rotor includes at least supplying the drive voltage to the electric motor 15. In some implementations, the rotation control of the rotor may include detecting the rotation position of the rotor and supplying the drive current in correspondence with the rotation position of the rotor.

A voltage detector 41 is configured to detect a terminal voltage of the electric motor 15. The voltage detector 41 is connected to, for example, the motor drive circuit 30 and the coil 15W. The voltage detector 41 provides the controller 40 with a voltage detection signal indicating the detected voltage. The controller 40 monitors the terminal voltage of the electric motor 15 based on the voltage detection signal.

The controller 40 may receive a request for stopping the electric motor 15 or the motor-driven compressor 10. In this case, the controller 40 outputs a stop instruction CS to stop the rotation control of the rotor 16 and determines the rotation condition of the rotor 16 based on the voltage detected by the voltage detector 41 after outputting the stop instruction CS. The controller 40 includes a control program that performs a restart preparation control configured to output a lock instruction CL to electrically or forcibly stop the rotation of the rotor 16 based on the determination result. In the embodiment, the restart preparation control of the controller 40 includes deactivating the upper arm switching elements 31*a*, 31*b*, and 31*c* so that the switching operations are not performed, and activating the lower arm switching elements 32*a*, 32*b*, and 32*c* so that the switching operations are performed. The electric braking effect of the electric motor 15 electrically or forcibly stops the rotation of the rotor 16 and locks the rotor 16.

The operation of the cooling-heating circuit 50 will now be described.

When the rotor 16 rotates forward, the rotation shaft 20 causes the movable scroll 23 to orbit in the forward direction. Accordingly, the compression unit 14 performs compressing and discharging operations, and the refrigerant circulates through the cooling-heating circuit 50. The refrigerant is drawn through the suction opening 122 into the motor compartment 121. The refrigerant is drawn from the motor compartment 121 into the compression chamber 25 via the suction passage 28. The low pressure refrigerant drawn into the compression chamber 25 is compressed by the orbiting motion (discharging operation) of the movable scroll 23. The compressed refrigerant opens the discharge valve 22*v*. This discharges the refrigerant out of the discharge port 22*e* to the discharge chamber 131 of the discharge housing 13. The high pressure refrigerant is discharged from the discharge chamber 131 through the discharge opening 13*a* to the discharge pipe 57.

During a cooling operation, the pipe switching valve 51 is switched to the first state. This communicates the first and second openings 51*a* and 51*b* and communicates the third and fourth openings 51*c* and 51*d*. Thus, the refrigerant flows from the discharge pipe 57 to the first heat exchanger 52 via the first and second openings 51*a* and 51*b* and the first pipe 58. In the first heat exchanger 52, the refrigerant is condensed when exchanging heat with the ambient air. The condensed refrigerant flows from the first heat exchanger 52 into the first expansion valve 54 via the second pipe 59. The refrigerant in the first expansion valve 54 is depressurized by the first expansion valve 54 to a medium pressure (intermediate pressure) between the discharge pressure (high pressure) and the suction pressure (low pressure). Then, the refrigerant flows into the vapor-liquid separator 56 via the third pipe 60. The refrigerant in the vapor-liquid separator 56 is separated into gaseous and liquid refrigerants by the vapor-liquid separator 56.

The liquid refrigerant separated by the vapor-liquid separator 56 flows into the second expansion valve 55 via the fourth pipe 61. The second expansion valve 55 depressurizes the liquid refrigerant. The depressurized liquid refrigerant flows from the second expansion valve 55 into the second heat exchanger 53 via the fifth pipe 62. In the second heat exchanger 53, the liquid refrigerant is vaporized by exchanging heat with the air in the passenger compartment. This cools the air in the passenger compartment. The vaporized refrigerant flows from the second heat exchanger 53 back to the motor compartment 121 via the sixth pipe 63, the third and fourth openings 51*c* and 51*d*, and the suction pipe 64 and through the suction opening 122.

The gaseous refrigerant separated by the vapor-liquid separator 56 flows into the injection pipe 29*a*. When the air in the passenger compartment is cooled (during cooling operation), the refrigerant drawn into the motor compartment 121 has a high temperature and a high pressure. Thus, the pressure difference between the motor-driven compressor side and the vapor-liquid separator side closes the injection pipe 29*a* with the check valve 66. This restricts delivery of the gaseous refrigerant from the injection pipe 29*a* through the injection ports 29 to the compression chamber 25.

During a heating operation, the pipe switching valve 51 is switched to the second state. This communicates the first and third openings 51*a* and 51*c* and communicates the second and fourth openings 51*b* and 51*d*. Thus, the refrigerant flows from the discharge pipe 57 to the second heat exchanger 53 via the first and third openings 51*a* and 51*c* and the sixth pipe 63. In the second heat exchanger 53, the refrigerant is condensed by exchanging heat with the air in the passenger compartment. This heats the air in the passenger compartment. The condensed refrigerant flows from the second heat exchanger 53 into the second expansion valve 55 via the fifth pipe 62. The refrigerant in the second expansion valve 55 is depressurized to a medium pressure (intermediate pressure) between the discharge pressure (high pressure) and the suction pressure (low pressure) by the second expansion valve 55. Then, the refrigerant flows into the vapor-liquid separator 56 via the fourth pipe 61. The refrigerant in the vapor-liquid separator 56 is separated into gaseous and liquid refrigerants by the vapor-liquid separator 56.

The liquid refrigerant separated by the vapor-liquid separator 56 flows into the first expansion valve 54 via the third pipe 60. The first expansion valve 54 depressurizes the liquid refrigerant. The depressurized liquid refrigerant flows from the first expansion valve 54 into the first heat exchanger 52 via the second pipe 59. In the first heat exchanger 52, the liquid refrigerant is vaporized by exchanging heat with the external air. The vaporized refrigerant flows from the first heat exchanger 52 back to the motor compartment 121 via the first pipe 58, the second and fourth openings 51b and 51d, and the suction pipe 64 and through the suction opening 122.

The gaseous refrigerant separated by the vapor-liquid separator 56 flows into the injection pipe 29a. When the air in the passenger compartment is heated (during heating operation), the refrigerant drawn into the motor compartment 121 has a low temperature and a low pressure. Thus, the pressure difference between the motor-driven compressor side and the vapor-liquid separator side opens the injection pipe 29a with the check valve 66. This allows for delivery of the gaseous refrigerant from the injection pipe 29a through the injection ports 29 to the compression chamber 25.

The intermediate pressure gaseous refrigerant is delivered to the compression chamber 25 through the injection ports 29. This increases the amount of the gaseous refrigerant drawn into the compression chamber 25 and improves the performance of the motor-driven compressor 10 during a high load operation, such as a heating operation.

The operation of the embodiment will now be described.

When the operation of the motor-driven compressor 10 is stopped, the controller 40 provides the motor drive circuit 30 with the stop instruction CS to stop the rotation control of the rotor 16. In response to the stop instruction CS, the motor drive circuit 30 stops the application of a drive voltage. This decreases the forward rotation speed of the rotor 16. When the forward rotation of the rotor 16 stops, the residual intermediate pressure gaseous refrigerant remaining in the injection pipe 29a is injected through the injection port 29 into the compression chamber 25. This prompts the movable scroll 23 to orbit in a reverse direction, which is opposite to that when the motor-driven compressor 10 is operated. The orbiting motion of the movable scroll 23 in the reverse direction would also rotate the rotor 16 in the reverse direction.

Figure 5:
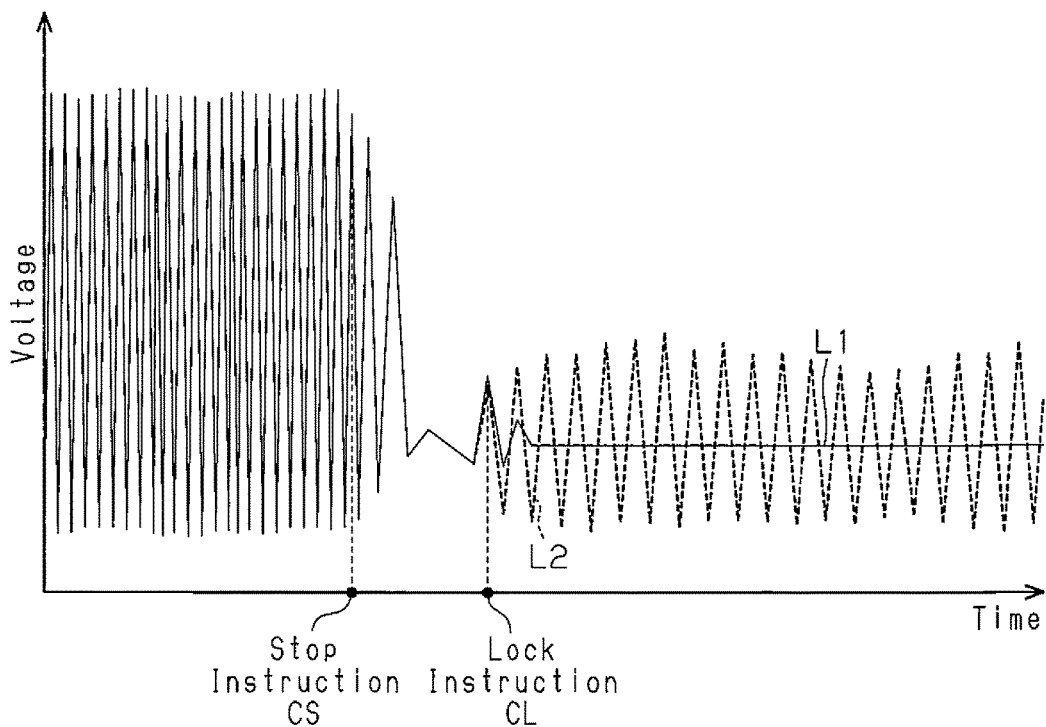
FIG. 5 is a graph showing changes in the voltage detected by a voltage detector.

FIG. 5 shows changes in the voltage detected by the voltage detector 41. The solid line L1 and the broken line L2 of FIG. 5 respectively indicate changes in the voltage of the present embodiment and a comparative example (which takes a long time for the reverse rotation of the rotor to converge).

As shown in FIG. 5, when the controller 40 outputs the stop instruction CS, the voltage detected by the voltage detector 41 gradually decreases before increasing again. The amplitude of the voltage is proportional to the rotation speed of the rotor 16. Thus, the controller 40 may calculate the rotation speed of the rotor 16 based on the amplitude of the voltage. When the amplitude of the voltage detected by the voltage detector 41 becomes less than a threshold (e.g., 20 V), the controller 40 determines that the rotation speed of the rotor 16 is low enough to restart the rotation control of the rotor 16. That is, the controller 40 determines that the rotor 16 is not rotating reversely. When the amplitude of the voltage detected by the voltage detector 41 is greater than or equal to the threshold (e.g., 20 V), the controller 40 determines that the rotation speed of the rotor 16 is still not low enough to restart the rotation control of the rotor 16. That is, the controller 40 determines that the rotor 16 is rotating reversely.

For example, when the controller 40 determines that the rotor 16 is rotating reversely, the controller 40 of the present embodiment outputs the lock instruction CL (restart preparation control) to electrically or forcibly stop the rotor 16. For example, the controller 40 deactivates the upper arm switching elements 31a, 31b, and 31c to stop the switching operations of the upper arm switching elements 31a, 31b, and 31c. Further, the controller activates the lower arm switching elements 32a, 32b, and 32c so that the lower arm switching elements 32a, 32b, and 32c perform the switching operations. This electrically or forcibly stops the rotation of the rotor 16.

Then, the controller 40 restarts the rotation control of the rotor 16 and controls the switching operations of the upper arm switching elements 31a, 31b, and 31c and the lower arm switching elements 32a, 32b, and 32c. The switching operations of the upper arm switching elements 31a, 31b, and 31c and the lower arm switching elements 32a, 32b, and 32c convert the direct current voltage to alternating current voltage. By applying the alternating current voltage to the electric motor 15, the rotor 16 rotates forward. This smoothly restarts the motor-driven compressor 10 even when the rotor 16 rotates reversely.

The present embodiment has the advantages described below.

(1) The controller 40 outputs the stop instruction CS to stop the rotation control of the rotor 16 and determines the rotation condition of the rotor 16 based on the voltage detected by the voltage detector 41 after the output of the stop instruction CS. The controller 40 performs the restart preparation control configured to output the lock instruction CL to electrically or forcibly stop the rotation of the rotor 16 based on the determination result. In this manner, the controller 40 may electrically or forcibly stop the rotation of the rotor 16 by performing the restart preparation control. This quickly stops the rotation of the rotor 16. Thus, the motor-driven compressor 10 may be smoothly restarted.

(2) The restart preparation control of the controller 40 includes outputting the lock instruction CL when the controller 40 determines that the rotor 16 is rotating reversely based on the voltage detected by the voltage detector 41. In this manner, even when the rotor 16 rotates reversely, the controller 40 may electrically or forcibly stop the reverse rotation of the rotor 16 by performing the restart preparation control. This smoothly restarts the motor-driven compressor 10.

(3) The restart preparation control of the controller 40 includes outputting the lock instruction CL configured to deactivate the upper arm switching elements 31a, 31b, and 31c and activate the lower arm switching elements 32a, 32b, and 32c. In this manner, the controller 40 may easily perform the restart preparation control just by changing the switching operations of the upper arm switching elements 31a, 31b, and 31c and the lower arm switching elements 32a, 32b, and 32c.

It should be apparent to those skilled in the art that the present invention may be embodied in many other specific forms without departing from the scope of the invention. Particularly, it should be understood that the present invention may be embodied in the following forms.

The restart preparation control of the controller 40 may include outputting the lock instruction CL when the controller 40 determines the rotation of the rotor 16 is stopped based on the voltage detected by the voltage detector 41. In this case, the controller 40 performs the restart preparation control when the rotor 16 is being stopped. Thus, the rotor 16 does not rotate reversely. This modified example allows for reduction in the load used to electrically stop the rotor 16 as compared to when the controller 40 performs the restart preparation control while the rotor 16 is rotating. It is desirable that the residual intermediate pressure gaseous refrigerant be eliminated from the injection pipe 29a when the rotor 16 is not rotating. This prevents the residual intermediate pressure gaseous refrigerant from being drawn into the compression chamber 25 through the injection ports 29 when the rotor 16 starts to rotate forward. Consequently, the reverse rotation of the rotor 16 may be restricted.

The restart preparation control of the controller 40 may include outputting the lock instruction CL configured to activate the upper arm switching elements 31a, 31b, and 31c and deactivate the lower arm switching elements 32a, 32b, and 32c.

The restart preparation control of the controller 40 may include outputting the lock instruction CL configured to supply a predetermined current to the electric motor 15. In this case, a current value that sufficiently stops the rotation of the rotor 16 is determined in advance through experiments or simulations. The current value is stored in the controller 40 in advance.

The controller 40 may determine the rotation condition of the rotor 16 based on a frequency of the voltage detected by the voltage detector 41. More specifically, when the voltage detected by the voltage detector 41 has a frequency less than 30 Hz, the controller 40 determines that the rotation speed of the rotor 16 is low enough to restart the rotation control of the rotor 16. That is, the controller 40 determines that the rotor 16 is not rotating reversely. When the voltage detected by the voltage detector 41 has a frequency greater than or equal to 30 Hz, the controller 40 determines that the rotation speed of the rotor 16 is not low enough to restart the rotation control of the rotor 16. That is, the controller 40 determines that the rotor 16 is rotating reversely.

The voltage detector 41 may be electrically connected between two of the coils 15U, 15V, and 15W. In this case, the voltage used to determine that the rotor 16 has stopped is more easily obtained than when, for example, the voltage detector 41 is electrically connected between the motor drive circuit 30 and the coil 15W.

The voltage detector 41 may start detecting the voltage after the controller 40 outputs the stop instruction CS. The voltage detector 41 may stop detecting the voltage after the controller 40 outputs the lock instruction CL. This reduces the operation frequency of the voltage detector 41 as compared to when the voltage detector 41 constantly detects the voltage.

The injection ports 29 are not limited to a particular shape. For example, an elliptic shape corresponding to the spiral shape of the fixed spiral wall 22b may be used.

The movable base plate 23a may also include an injection port.

The injection ports 29 may be omitted, and the movable base plate 23a may include an injection port.

The cover 19 may be attached to a circumferential wall of the motor housing 12. The motor drive circuit 30 may be accommodated between the circumferential wall of the motor housing 12 and the cover 19.

The compression unit 14 may be, for example, of a piston type or a vane type.

The motor-driven compressor 10 does not have to be installed in a vehicle. The motor-driven compressor 10 may be used with an air-conditioning system other than that for a vehicle.

The controller 40 may include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The invention claimed is:

1. A motor-driven compressor comprising:
   a compression unit including a movable scroll, a fixed scroll, and a compression chamber formed by engagement of the movable scroll and the fixed scroll, wherein the compression unit compresses low pressure refrigerant drawn into the compression chamber to discharge high pressure refrigerant;
   an electric motor including a rotor, wherein the electric motor drives the compression unit;
   a motor drive circuit that drives the electric motor;
   an injection port that draws intermediate pressure refrigerant into the compression chamber;
   a controller that performs rotation control on the rotor; and
   a voltage detector that detects an amplitude of a terminal voltage of the electric motor, wherein
   the controller is configured to
      output a stop instruction to deactivate the rotation control of the rotor,
      determine a rotation condition of the rotor based on the voltage amplitude detected by the voltage detector after outputting the stop instruction, and
      perform, based on a determination of the rotation condition and the voltage amplitude being below a predetermine threshold, a restart preparation control that includes outputting a lock instruction to electrically stop rotation of the rotor,
   wherein
   the motor drive circuit includes a plurality of upper arm switches and a plurality of lower arm switches,
   the plurality of upper arm switches and the plurality of lower arm switches convert a direct current voltage to an alternating current drive voltage, and
   the restart preparation control includes outputting the lock instruction configured to activate at least one first switch in a first plurality of switches that is one of the plurality of upper arm switches and the plurality of lower arm switches so that the at least one first switch performs a switching operation and to deactivate all second switches in a second plurality of switches that is the other one of the plurality of upper arm switches and the plurality of lower arm switches so that all the second switches do not perform a switching operation.

2. The motor-driven compressor according to claim 1, wherein the restart preparation control includes outputting the lock instruction when determining that the rotor is rotating reversely based on the voltage detected by the voltage detector.

3. The motor-driven compressor according to claim 1, wherein the restart preparation control includes outputting the lock instruction when determining that the rotor has stopped rotating based on the voltage detected by the voltage detector.

4. The motor-driven compressor according to claim 1, wherein the restart preparation control includes
   determining a rotation condition of the rotor based on an amplitude of the voltage detected by the voltage detector, and
   outputting the lock instruction based on a determination of the rotation condition.

5. The motor-driven compressor according to claim 1, wherein the restart preparation control includes
   determining the rotation condition of the rotor based on a frequency of the voltage detected by the voltage detector, and
   outputting the lock instruction based on a determination of the rotation condition.

6. The motor-driven compressor according to claim 1, wherein the restart preparation control includes outputting the lock instruction so that the motor drive circuit supplies a predetermined current to the electric motor.

7. The motor-driven compressor according to claim 1, wherein the injection port is located in a fixed base plate forming the fixed scroll.

8. The motor-driven compressor according to claim 1, wherein each one of the plurality of upper arm switches and each one of the plurality of lower arm switches includes a base, an emitter, and a collector.

9. The motor-driven compressor according to claim 1, wherein the total number of the plurality of upper arm switches is equal to the total number of the plurality of lower arm switches.

10. The motor-driven compressor according to claim 1, wherein the controller is configured to not perform the restart preparation control when the voltage amplitude is above the predetermined threshold.

* * * * *